United States Patent [19]
Gram

[11] 3,924,758
[45] Dec. 9, 1975

[54] APPARATUS FOR STACKING OBLONG ARTICLES

[75] Inventor: Hans Gram, Vojens, Denmark

[73] Assignee: Brodrene Gram A/A, Vojens, Denmark

[22] Filed: June 4, 1974

[21] Appl. No.: 476,292

[30] Foreign Application Priority Data
June 8, 1973  Denmark............................ 3194/73

[52] U.S. Cl.................................... 214/7; 214/7 X
[51] Int. Cl.².......................................... B65G 57/18
[58] Field of Search........................................ 214/7

[56] References Cited
UNITED STATES PATENTS

| | | | |
|---|---|---|---|
| 1,582,820 | 4/1926 | Hungerford.......................... | 214/7 X |
| 2,559,819 | 7/1951 | Hettinger................................. | 214/7 |
| 2,797,098 | 6/1957 | Brodie..................................... | 214/7 |
| 3,764,025 | 10/1973 | Van Melle.............................. | 214/7 |

Primary Examiner—Leo Friaglia
Assistant Examiner—John A. Pekar
Attorney, Agent, or Firm—Watson, Cole, Grindle & Watson

[57] ABSTRACT

Apparatus for stacking ice sticks, having generally a rectangular cross-section form, comprising a supply conveyor and a turning device, being divided into compartments, the width of which corresponds to the smaller cross-section dimension of the ice sticks for accommodating the ice sticks from the supply conveyor placed edgeways and for delivering the ice sticks in this position to an accumulator, wherein the accumulator comprises three oblong supporting plates which at one end thereof are connected to a rocking device, the rocking axis of which extends perpendicular to the direction of transportation of the supply conveyor, and the free ends of which are movable from a position in which they extend into the compartments of the turning device and to a position in which the ends are rocked up over the compartments, the accumulator, moreover, comprising two supporting ribs of which one is movable above the supporting plates and in the longitudinal direction of the supporting plates.

1 Claim, 6 Drawing Figures

APPARATUS FOR STACKING OBLONG ARTICLES

BACKGROUND OF THE INVENTION

The present invention relates to an apparatus for stacking oblong articles, having generally a rectangular cross-section form, comprising a supply conveyor and a turning device, being divided into compartments, the width of which corresponds to the smaller cross-section dimension of the articles for accomodating the articles from the supply conveyor standing upright and for delivering the articles in this position to an accumulator.

A stacking apparatus of this kind is disclosed in Danish Pat. application No. 4026/72, filed Aug. 5, 1972, now Danish Pat. No. 128,361.

SUMMARY OF THE INVENTION

It is the object of the present invention to provide an apparatus of the kind referred to above by means of which it is possible to divide the articles supplied to the apparatus into groups, each containing an appropriate number of articles so that such groups may easily be packed or may easily be transferred to a packing plant, and this object is according to the invention achieved in that the accumulator comprises at least two oblong supporting plates which at one end thereof are connected to a rocking device, the rocking axis of which extends perpendicular to the direction of transportation of the supply conveyor, and the free ends of which are movable from a position in which they extend into the compartments of the turning device and to a position in which the ends are rocked up over the compartments, the accumulator, moreover, comprising at least two supporting ribs of which at least one is movable above the supporting plates and in the longitudinal direction of the supporting plates.

By means of this construction the articles fed to the stacking apparatus may easily be divided into groups, each containing an appropriate number of articles, being that a rocking of the supporting plates will move the supporting plates clearly of the turning device in such a way that the articles, which have been transferred to the supporting plates by means of the turning device, form a group which may be treated as a unit during the following packing operation of the groups into individual containers or cartons. Moreover, when a group of articles has been transferred to the supporting plates, the articles will remain upright due to the action of the supporting ribs.

DESCRIPTION OF THE PREFERRED EMBODIMENT

Figure 1:
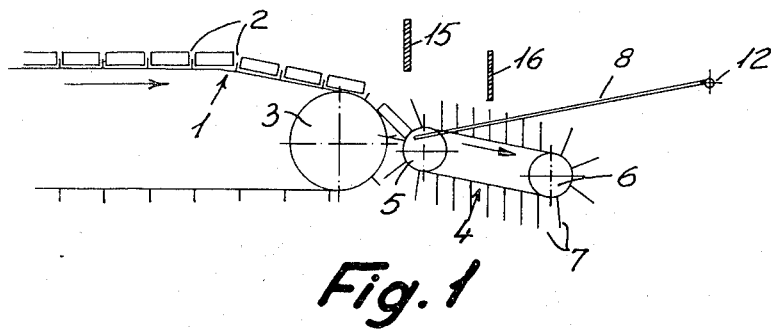
FIG. 1 is a diagrammatic side view of a portion of an apparatus according to the invention.

The apparatus illustrated comprises a supply conveyor 1 which in the embodiment illustrated on the drawing is divided into compartments by means of sets of pushing dogs 2. The supply conveyor extends around a set of guiding roliers 3 and consists of three parallel extending chains or belts.

In the embodiment illustrated, the articles consist of ice sticks each wrapped in a piece of sheet material, e.g. paper. The articles have a generally rectangular cross-section form as it appears from FIG. 1. As it appears from FIG. 3, the ice sticks are positioned on the supply conveyor in two rows adjacent to each other and in such a way that the adjacent ends of the articles in the two rows partly overlap each other. The ice sticks arrive from a packing apparatus (not shown) fed by an ice stick producing machine (not shown).

4 is a turning device, comprising three parallel extending chains or belts, which extend around two sets of guiding rollers 5 and 6. Also the turning device is divided into compartments, viz. by means of sets of pushing dogs 7, and the width of the compartments is a little greater than the smaller cross-section dimension of the articles. The free ends of the pushing dogs 7 extend into the spaces between the rollers of the guiding roller set 3 in such a way that an article when it falls down from the supply conveyor as indicated in FIG. 1, is caught in a compartment of the turning device and is accommodated therein standing upright.

Figure 3:
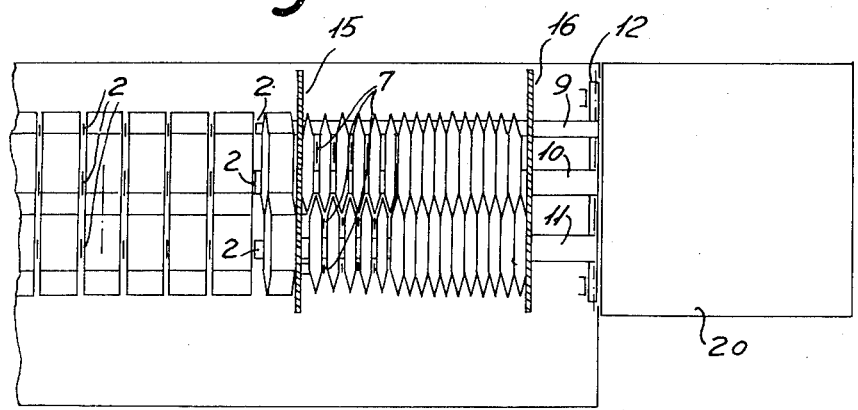
FIG. 3 is a top view of the apparatus as shown in FIG. 2.
Figure 4:
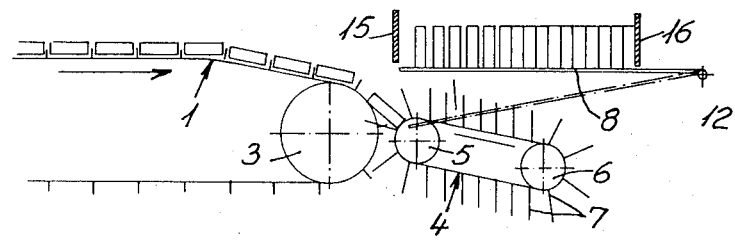
FIG. 4 is a view also corresponding to FIG. 1, but showing a further working position, FIG. 5 a view also corresponding to FIG. 1, but for illustrating the transfer of a stacked group of articles, and FIG. 6 a top view corresponding to FIG. 5.

Moreover, the apparatus comprises an accumulator 8 which in the embodiment illustrated comprises three parallel stripformed supporting plates 9, 10 and 11, cf. FIG. 3. One end of the supporting plates is secured to a rocking shaft 12 which is connected to a driving device, not shown, in such a way that the plates 9, 10 and 11 may be rocked from the position shown in FIG. 1 to the position shown in FIG. 4. In the position of the apparatus shown in FIG. 1 the free ends of the plates 9, 10 and 11 extend into the spaces between the rollers of the set of guiding rollers 5 and in such a way that the sets of pushing dogs 7 of the turning device 4 can pass through the spaces between the plates 9, 10 and 11.

When the pushing dogs 7 of the turning device 4 are moved in the direction indicated by the arrow 12 in FIG. 1 by driving means (not shown) connected to one of the sets of guiding rollers 5 or 6, the articles will be pushed from the turning device and onto the supporting plates 9, 10 and 11 standing upright, and due to the fact that the supporting plates of the accumulator in the position shown in FIG. 1 enclose a diverging angle with the direction of movement of the pushing dogs 7, the latter will successively be withdrawn from the spaces between the plates 9, 10 and 11 so that the articles will remain standing upright on the plates.

Figure 2:
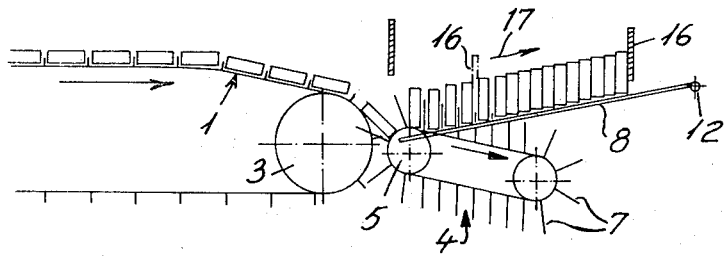
FIG. 2 is a view of the apparatus in FIG. 1, but shown in another working position.

In order to prevent the articles transferred to the plates 9, 10 and 11 from tilting over, two supporting ribs 15 and 16 are arranged above the accumulator 8. The supporting rib 16 is movable in the longitudinal direction of the plates 9, 10 and 11 by guiding rails, not shown, and is moved to the right from the position shown in FIG. 1 as the articles are transferred to the accumulator by means of the turning device 4 as indicated in FIG. 2 wherein the supporting rib 16 is shown in its initial position by dotted lines and wherein the movement of the rib 16 is indicated by means of an arrow 17.

Figure 5:
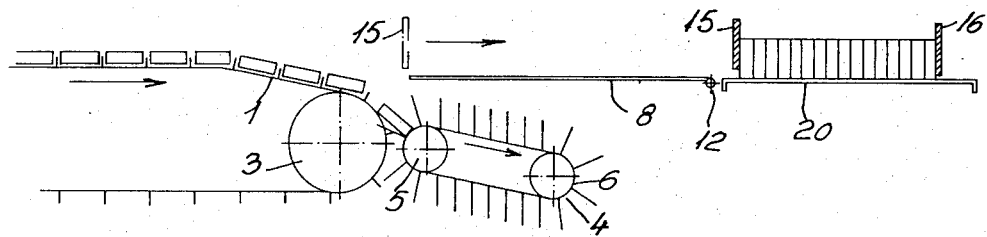
Figure 6:
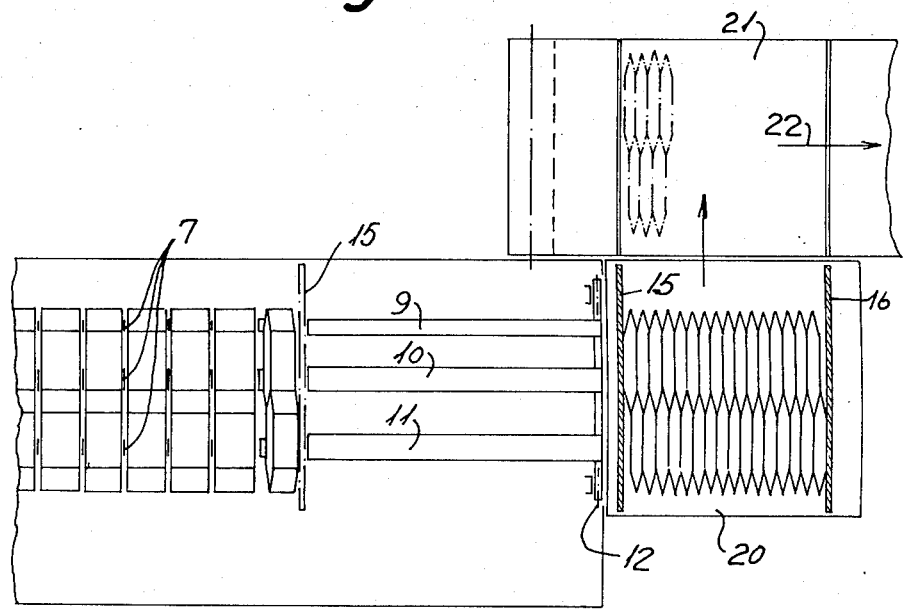

The embodiment of the apparatus illustrated works stepwise. During one working period, during which the supply conveyor 1 and the turning device 4 are moved, 16 pairs of articles are transferred to the accumulator 8, and during this transfer the supporting rib 16 is moved as explained above until it reaches the position shown in FIG. 2. At the end of this period the rocking shaft 12 is turned so as to move the accumulator to the position shown in FIG. 4, wherein the free ends of the strip-formed plates 9, 10 and 11 have been moved clearly of the pushing dogs of the turning device and are positioned adjacent to the supporting rib 15. It is now possible, by moving the supporting rib 15 as indicated by means of the arrow in FIG. 5, to transfer the group of articles from the accumulator and onto a distributor table 20 from which the group of articles as indicated in FIG. 6 may be transferred to a conveyor 21, which carries the group of articles transferred thereto, in the direction indicated by the arrow 22. The following group of articles which is transferred to the distributing table may be moved in the opposite direction to another conveyor, not shown, positioned at the end of the table 20 opposite of the conveyor 21.

By means of the embodiment of the stacking apparatus illustrated on the drawing, the articles supplied by means of the supply conveyor are divided into groups at the same rate by which they are supplied from the supply conveyor, but it will be understood that nothing prevents a further dividing of the groups by arranging one or more partitions between the supporting ribs 15 and 16.

In the embodiment shown on the drawing the accumulator comprises three strip-formed plates 9, 10 and 11 for supporting two rows of articles. However, it will be understood that if only one row of articles is used, two such plates will be sufficient for supporting the articles in the accumulator.

I claim:

1. An apparatus for stacking oblong articles, each having a generally rectangular cross-sectional shape, comprising: a supply conveyor for the conveyance of a succession of articles to be stacked, said supply conveyor being divided into compartments by pushing dogs, said compartments having a width sufficient for accommodating said articles lying on their broader sides, said supply conveyor passing around a set of spaced rollers; a further conveyor divided into compartments by pushing dogs, the compartments of said further conveyor having a width sufficient for accommodating said articles standing on their smaller sides, the pushing dogs of said further conveyor being divided into sets and one end of said further conveyor being positioned adjacent said spaced rollers of said supply conveyor with said sets of pushing dogs aligned with and partly extending into the spaces between the rollers of said set of rollers for transferring articles from the compartments of said supply conveyor into the compartments of said further conveyor; an accumulator comprising at least two oblong supporting plates being arranged above said further conveyor, one end of said plates being secured to a rocking shaft extending perpendicular to the direction of transportation of said further conveyor, the other free ends of said plates being movable from a first position in which they extend into the compartments of said further conveyor between the sets of pushing dogs of said further conveyor for accumulating a group of articles transferred from said further conveyor and onto said plates, and to a second position in which said free ends are pivoted up over the compartments of said further conveyor, said accumulator, moreover, comprising at least two supporting ribs of which at least one being movable above said supporting plates in the second position thereof and in the longitudinal direction of said supporting plates for further transportation of said accumulated group.

* * * * *